(12) United States Patent
Dong et al.

(10) Patent No.: US 8,775,869 B2
(45) Date of Patent: Jul. 8, 2014

(54) DEVICE AND METHOD FOR COORDINATING AUTOMATIC PROTECTION SWITCHING OPERATION AND RECOVERY OPERATION

(75) Inventors: Jun Dong, Shenzhen (CN); Zhenyu Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 366 days.

(21) Appl. No.: 13/144,475

(22) PCT Filed: Jan. 21, 2010

(86) PCT No.: PCT/CN2010/070303
§ 371 (c)(1),
(2), (4) Date: Jul. 13, 2011

(87) PCT Pub. No.: WO2010/083764
PCT Pub. Date: Jul. 29, 2010

(65) Prior Publication Data
US 2011/0276825 A1    Nov. 10, 2011

(30) Foreign Application Priority Data
Jan. 22, 2009 (CN) .......................... 2009 1 0105244

(51) Int. Cl.
G06F 11/00 (2006.01)
(52) U.S. Cl.
USPC .......................................................... 714/15
(58) Field of Classification Search
USPC ...................................... 714/15, 48
See application file for complete search history.

(56) References Cited

U.S. PATENT DOCUMENTS

| 5,517,547 | A * | 5/1996 | Ladha et al. ............... 379/40 |
| 6,023,775 | A * | 2/2000 | Fujii ............... 714/48 |
| 6,205,562 | B1 * | 3/2001 | Fukushima et al. ........... 714/43 |
| 2003/0030862 | A1 * | 2/2003 | Trier et al. ............ 359/110 |

(Continued)

FOREIGN PATENT DOCUMENTS

| CN | 1710869 | 12/2005 |
| CN | 1764132 | 4/2006 |
| CN | 1815994 | 8/2006 |
| CN | 1874201 | 12/2006 |

OTHER PUBLICATIONS

PCT International Search Report, PCT/CN2010/070303, Dated May 6, 2010.

*Primary Examiner* — Yair Leibovich
(74) *Attorney, Agent, or Firm* — Knobbe, Martens, Olson & Bear, LLP

(57) ABSTRACT

The present invention relates to a device and a method for coordinating an APS operation and a recovery operation. The device includes a working channel detection unit, a protection channel detection unit, a protection protocol unit and a recovery protocol unit. The method comprises: when the working channel of current service fails, the working channel detection unit reporting a working channel alarm to the protection protocol unit and a recovery protocol unit of current node; the recovery protocol unit starting up a timer after receiving the working channel alarm, and the protection protocol unit determining whether the recovery operation needs to be started up immediately after receiving the working channel alarm, and if yes, the protection protocol unit notifying the recovery protocol unit to start up the recovery operation immediately; the recovery protocol unit starting up the recovery operation immediately after receiving the notification. The present invention reduces the damage time of the service in the case of the APS function failure.

11 Claims, 5 Drawing Sheets

(56) References Cited

U.S. PATENT DOCUMENTS

| | | | |
|---|---|---|---|
| 2004/0132409 A1* | 7/2004 | Arnold et al. | 455/67.11 |
| 2007/0046261 A1* | 3/2007 | Porebski | 320/132 |
| 2007/0260940 A1* | 11/2007 | Hekmat | 714/48 |
| 2011/0010589 A1* | 1/2011 | Pitchforth, Jr. | 714/48 |

\* cited by examiner

DEVICE AND METHOD FOR COORDINATING AUTOMATIC PROTECTION SWITCHING OPERATION AND RECOVERY OPERATION

FIELD OF THE INVENTION

The present invention relates to the optical network, in particular to a device and method for coordinating an Automatic Protection Switching (APS) operation and a recovery operation.

BACKGROUND OF THE INVENTION

With the increased expansion of network scale and demands for high-quality services, at present, the optical network has higher and higher demands for network survivability. The network survivability refers to that the network can still preserve acceptable service quality grade in the case of failures. The APS operations and the recovery operations are main means for improving optical network survivability and supporting the demands for QoS (Quality of Service) of service transfer.

The basic idea of the APS operations is to pre-configure a protection channel for services. In the case of fault occurring in the working channel, the working channel detection unit of corresponding node detects an alarm and reports it to the protection protocol unit of the present node; the protection protocol unit starts up an APS operation after receiving the working channel alarm, that is, the protection protocol unit runs the configured protection protocol algorithm and also exchanges signals with protection protocol units of other nodes in the protection channel; then the protection protocol unit of each node in the protection channel sends an switching instruction to the execution units of the present node respectively; finally, the execution units of each node in the protection channel execute the APS operation and switch the service over to the protection channel to ensure the normal operation of services. APS operations bring about the advantages of rapid switching and short service interruption time, but the network resources utilization rate is relatively low.

The recovery operations do not pre-configure protection channel for services. In the case of fault occurring in the working channel, the working channel detection unit of corresponding node detects an alarm and reports it to the recovery protocol unit of the present node; the recovery protocol unit starts up the recovery operation after receiving the working channel alarm, that is, this recovery protocol unit recalculates a new channel for services in the idle resources of current network, and also exchanges signals with recovery protocol units of other nodes in the new channel; then the recovery protocol unit of each node in the new channel sends a switching instruction to the execution units of the present node respectively; finally, the execution units of each node in the new channel execute recovery operation and switch services over to the new channel to ensure the normal operation of services. The recovery operation has a relatively high utilization rate of network resources, but it requires real-time computation of service channel and thus the service fault time is relatively long.

As for the service requiring higher QoS, the service is often provided with APS functions and recovery functions. As illustrated in FIG. 1, the device comprises a working channel detection unit, a protection protocol unit and a recovery protocol unit, wherein when the working channel detection unit detects a working channel alarm, it reports the alarm to the protection protocol unit and the recovery protocol unit; the protection protocol unit starts up an APS operation immediately after receiving the working channel alarm, while the recovery protocol unit waits for a pre-set time period (holdoff) after receiving the working channel alarm and then checks whether the working channel detection unit still detects an alarm or not, wherein if yes, it starts up the recovery operation, otherwise the recovery operation needs not to be started up because the service operation is normal. Due to lack of signaling interaction between the protection protocol unit and the recovery protocol unit, in the case of the APS function failure, e.g. when the working channel and protection channel of the service both fail and the recovery operation shall be started up immediately, the recovery protocol unit can not start up the recovery operation until waiting for the time of period (holdoff), such that the service fault time is increased by the time of holdoff, which increases service interruption time.

SUMMARY OF THE INVENTION

The technical problem which the present invention needs to solve is to provide a device and a method for coordinating an APS operation and a recovery operation so as to reduce the service fault time in the case of fault of the APS function occurring.

The technical scheme that the present invention adopts to solve its technical problem is:

A device for coordinating an APS operation and a recovery operation, comprising a working channel detection unit, a protection protocol unit and a recovery protocol unit;

The working channel detection unit is configured to monitor the working channel failures of the services, and to report an alarm to the protection protocol unit and the recovery protocol unit in the case of failure occurring in the working channel.

The protection protocol unit is configured to receive the working channel alarm, and to determine whether a recovery operation needs to be started up immediately; wherein if yes, it notifies the recovery protocol unit to start up the recovery operation immediately, otherwise starts up an APS operation;

The recovery protocol unit is configured to receive the working channel alarm and the notification of immediately starting up the recovery operation, wherein it starts up the recovery operation when the notification of immediately starting up the recovery operation is received, or when the working channel alarm still exists even if the time limit expires.

The device also comprises a protection channel detection unit, which is configured to perform fault monitoring on the protection channel of services and to report an alarm to the protection protocol unit when the protection channel fails; and the protection protocol unit is also configured to receive alarms of the protection channel.

The protection protocol unit is also configured to determine the type of received alarm, and to record the alarm information and mark the state of the protection channel as "on alarm" when the protection channel alarm is received.

A method for coordinating an APS operation and a recovery operation, comprises the following steps:

step a: a working channel detection unit reporting a working channel alarm to a protection protocol unit and a recovery protocol unit of the present node when the working channel of current service fails;

step b: the recovery protocol unit starting up a timer after receiving the working channel alarm, the protection protocol unit determining whether the recovery operation needs to be started up immediately after receiving the working channel alarm, wherein if yes, entering step c;

step c: the protection protocol unit notifying the recovery protocol unit to start up the recovery operation immediately, and the recovery protocol unit starting up the recovery operation immediately when the notification is received, and the alarm processing for this time is finished.

In step b, if the result of the determination is the recovery operation needs not to be started up immediately, and the recovery protocol unit checks whether the working channel detection unit still has the alarm after waiting for expiration of the timer, wherein if the result is yes, it starts up the recovery operation, and then the alarm processing for this time is finished, otherwise the alarm processing for this time is finished.

In the above mentioned method, if the protection channel of current service fails, the protection channel detection unit reports a protection channel alarm to the protection protocol unit of the present node.

The protection protocol unit determines the type of an alarm after receiving the alarm, wherein if it is a working channel alarm, executes step b; if it is a protection channel alarm, records the alarm information and marks the state of the protection channel as "on alarm".

In step b, the protection protocol unit determines whether a recovery operation needs to be started up immediately in the following approaches:

step A: checking whether the state of the protection channel of current service is of having an alarm, wherein if yes, the recovery operation needs to be started up immediately, otherwise executing step B;

step B: checking whether the protection group of the service is in non-enabled state, where if the result is yes, the recovery operation needs to be started up immediately, otherwise the recovery operation needs not to be started up immediately.

The protection protocol unit notifies the recovery protocol unit to start up the recovery operation immediately via but not limited to a Data Communication Network (DSN), High Level Data Link Control (HDLC) protocol bus, and a communication approach among internal processes among internal processes of Central Processing Unit (CPU).

The protection channel detection unit reports the alarm to the protection protocol unit via but not limited to a DCN and a HDLC protocol bus.

The beneficial effects of the present invention lie mainly in: the method for coordinating an APS operation and a recovery operation of the present invention can be realized through the device for coordinating an APS operation and a recovery operation of the present invention wherein a protection channel detection unit is added in the device to detect the protection channel of services, achieving the monitoring of the protection channel failures, meanwhile, a communication mechanism is added between the protection protocol unit and the recovery protocol unit to achieve signal interaction between the both. In this method, after receiving a service working channel alarm, the protection protocol unit first determines whether the recovery operation needs to be started up immediately according to the conditions of the protection channel, and in the case of fault of the APS function occurring, notifies the recovery protocol unit which is waiting for expiration of the timer to start up the recovery operation immediately so as to reduce the service fault time.

DETAILED DESCRIPTION OF THE EMBODIMENTS

Figure 1:
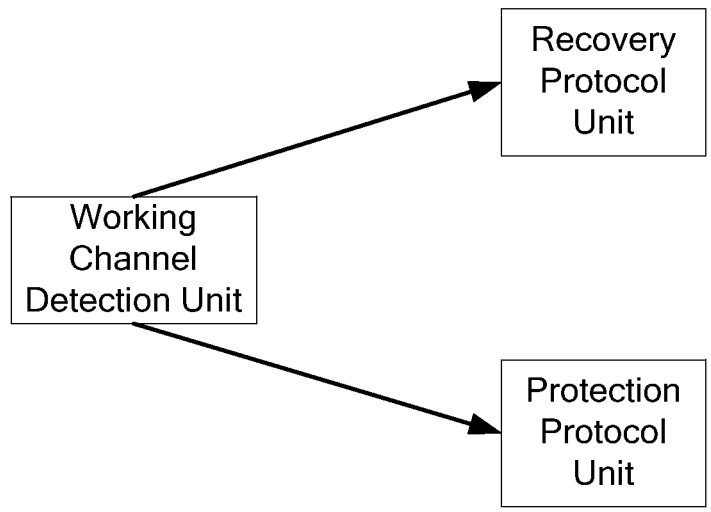
FIG. 1 is a structure schematic diagram of the device for coordinating an APS operation and a service recovery operation in the existing art.

FIG. 1 has been described in Background of the Invention, so it will not be repeated herein. A further description of the invention will be given with reference to other drawings hereinafter.

Figure 2:
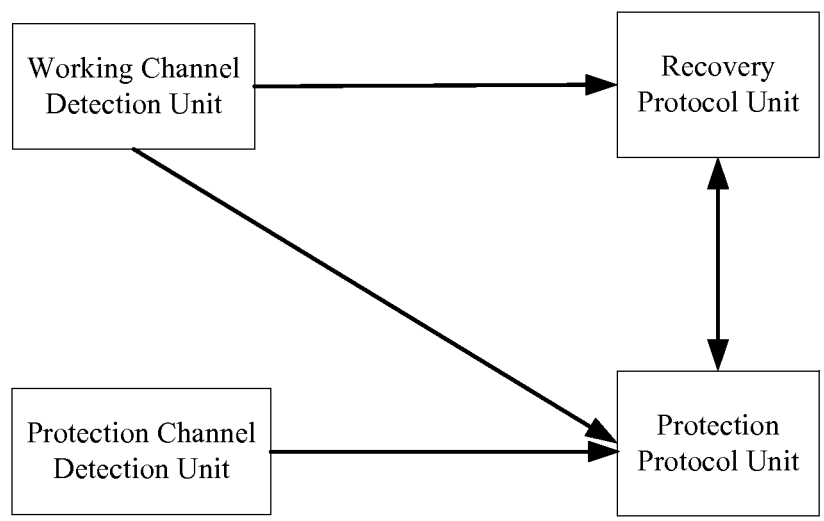
FIG. 2 is a structure schematic diagram of the device of the present invention.

As illustrated in FIG. 2, a device for coordinating an APS operation and a recovery operation, which is applied to each node of optical network, comprises a working channel detection unit, a protection channel detection unit, a protection protocol unit, and a recovery protocol unit, wherein the working channel detection unit is configured to monitor the working channel failures of services and to report an alarm to the protection protocol unit and the recovery protocol unit in the case of failure occurring in the working channel;

the protection channel detection unit is configured to perform fault monitoring on the protection channel of services and to report an alarm to the protection protocol unit in the case of protection channel fails; and the protection channel detection unit reports the alarm to the protection protocol unit by means of DCN and HDLC protocol bus;

the protection protocol unit is configured to receive the reported alarm, to determine the type of the alarm received, to record the alarm information and to mark the state of the protection channel as "on alarm" after receiving the protection channel alarm; and it is also configured to determine whether the recovery operation is necessary to be started up immediately after receiving the working channel alarm, wherein if necessary, notifies the recovery protocol unit to start up the recovery operation immediately, and if unnecessary, starts up the APS operation; and the protection protocol unit notifies the recovery protocol unit to start up the recovery operation through DCN, HDLC protocol bus, and Inter-Process communication of CPU;

the recovery protocol unit is configured to receive a working channel alarm and to start up a timer, and to start up the recovery operation when the notification of immediately starting up the recovery operation is received from the protection protocol unit, or when the working channel detection unit still has the alarms even if the timer expires.

That is to say, the recovery protocol unit is configured to receive the working channel alarm and the notification of immediately starting up the recovery operation, and to start up the recovery operation when the notification of immediately starting up the recovery operation is received, or in the case that the received working channel alarm still exists when the timer expires.

According to this embodiment, a protection channel detection unit is added in the above mentioned device to detect the protection channel of services, achieving the fault monitoring on the protection channel, and meanwhile a communication mechanism is established between the protection protocol unit and the recovery protocol unit, achieving the information interaction between the both.

Figure 3:
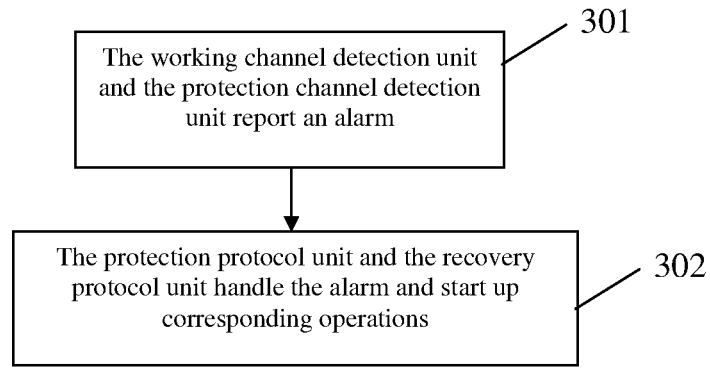
FIG. 3 is a flowchart of the method in the present invention.

As illustrated FIG. 3, the method for coordinating an APS operation and a recovery operation in this invention specifically comprises the following steps:

step 301: the working channel detection unit and protection channel detection unit respectively monitor the states of the working channel and the protection channel of current service, wherein if the working channel of current service fails, the working channel detection unit reports a working channel alarm to the protection protocol unit and the recovery protocol unit; and if the protection channel of current service fails, the protection channel detection unit reports a protection channel alarm to the protection protocol unit;

step 302: the protection protocol unit and the recovery protocol unit handle the received alarm at the same time; and start up a corresponding operation according to the handling results.

According to this embodiment, after receiving the working channel alarm of the service, the protection protocol unit first determines whether the recovery operation is necessary to be started up immediately based on the working channel conditions; wherein in the case of fault of APS function occurring, it notifies the recovery protocol unit which is waiting for the expiration of a timer to start up the recovery operation immediately so as to reduce the service fault time.

Figure 4:
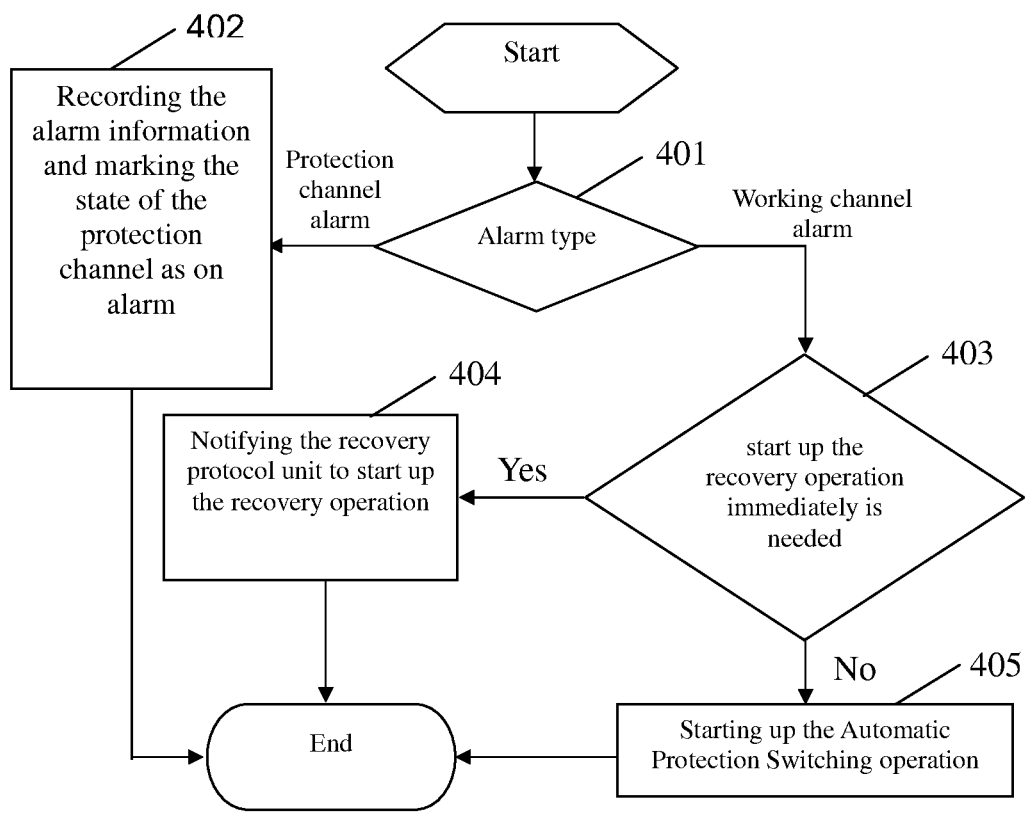
FIG. 4 is a flowchart of the protection protocol unit dealing with an alarm.

The particular steps for the protection protocol unit to handle the alarm are shown in FIG. 4, comprising:

step 401: the protection protocol unit determines the type of the received alarm, wherein if it is the protection channel alarm, step 402 is executed, and if it is the working channel alarm, step 403 is executed;

step 402: it records the alarm information and mark the state of the protection channel as "on alarm", and the handling of this alarm is finished;

step 403: whether the recovery operation needs to be started up immediately is determined, wherein if yes, it executes step 404; otherwise it executes step 405;

In this step the state of the protection channel of current service is checked wherein if it is available, the recovery operation needs not to be started up immediately; and if it is not available, the recovery operation needs to be started up immediately wherein the cases that the protection channel is not available include:

(1) a failure alarm occurring;
(2) the protection channel being in a "non-enabled" state;
(3) the protection channel incapable of guaranteeing the normal operation of services.

step 404: the recovery protocol unit is notified to start up the recovery operation;

step 405: the APS operation is started up.

According to this embodiment, the specific handling process for the protection protocol unit to handle alarms is achieved.

Figure 5:
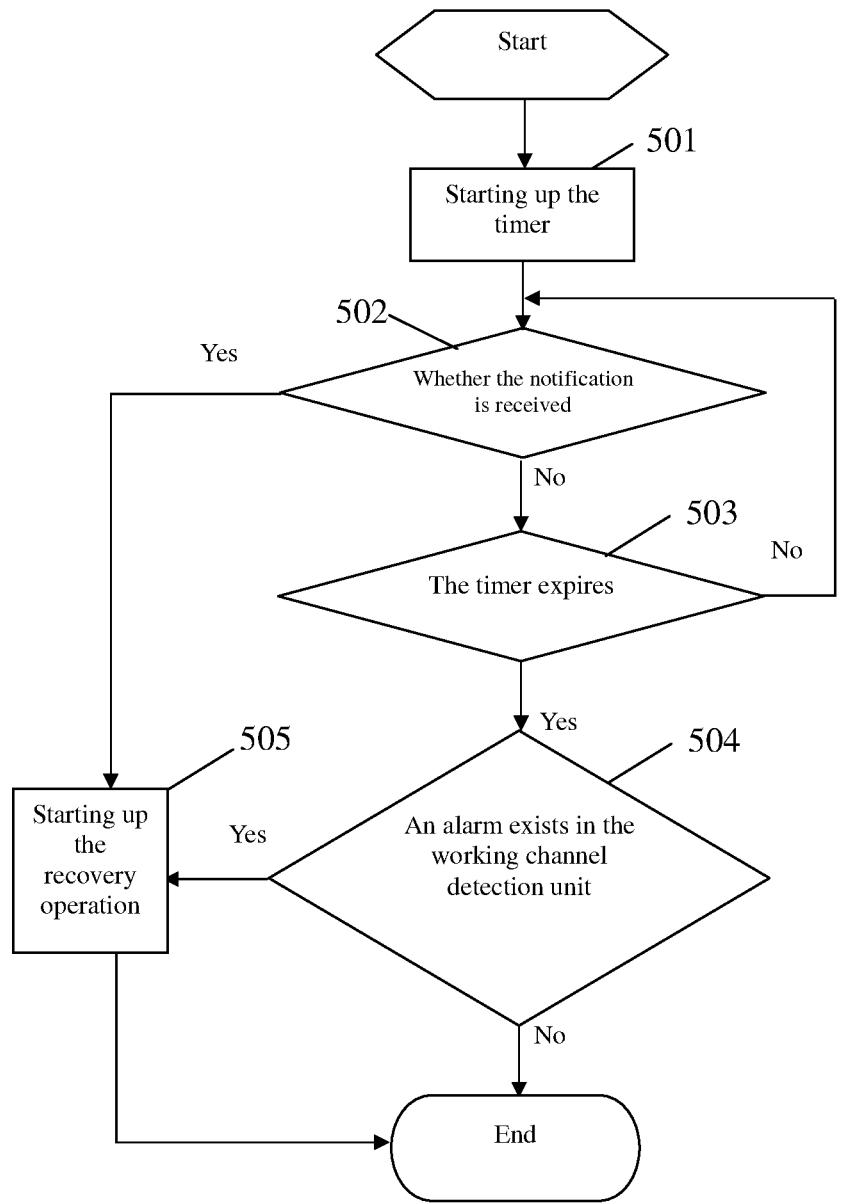
FIG. 5 is a flowchart of the recovery protocol unit dealing with an alarm.

Specific steps for the recovery protocol unit to deal with alarms are illustrated in FIG. 5, comprising:

step 501: the recovery protocol unit starts up a timer whose timing is set as holdoff;

step 502: whether the notification from the protection protocol unit is received is determined, wherein if yes, it executes Step 505; otherwise, it executes step 503;

step 503: whether the timer expires is determined, wherein if yes, it executes step 504; otherwise it executes step 502;

step 504: whether the working channel detection unit has an alarm is checked, wherein if yes, it executes step 505; otherwise the handling of this alarm is finished.

step 505: the recovery operation is started up, and the handling of this alarm is finished.

According to this embodiment, the particular handling process for the protection protocol unit to handle alarms is achieved.

Figure 6:
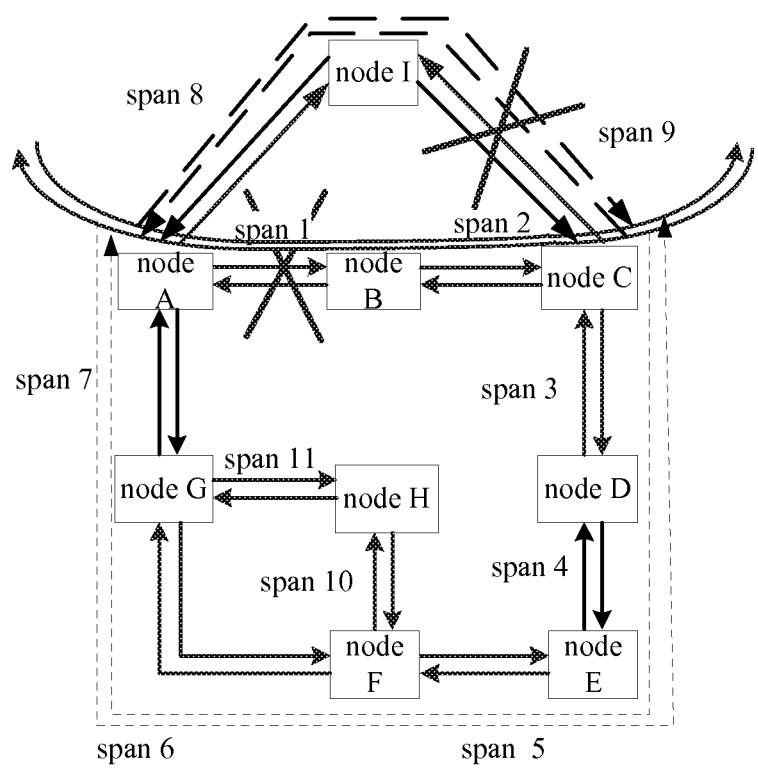
FIG. 6 is a schematic diagram of network topological structure in the first embodiment of the present invention.

FIG. 6 is the flowchart of network topological structure of the embodiment of the present invention under the condition that the service has 1+1 protection attribute and recovery attributes, wherein a pair of service 1 exists between node A and node C, and the work path of the service 1 is node A, node B and node C; this service has the 1+1 protection attribute, and its protection path is node A, node I and node C; meanwhile, this service also has a recovery attribute, wherein when a work path and a protection path of the service both fail, the recovery operation shall be executed for the service.

Supposing span 9 in the protection path of service 1 fails, the handling process of the protection protocol unitspec page is as follows:

step 6a: the protection protocol unit between Node A and Node C receives an alarm;

step 6b: the protection protocol unit determines the type of the alarm resource, and confirms it is a protection channel alarm;

step 6c: the protection protocol unit records the alarm information, and marks the state of the protection channel of service 1 as "on alarm".

Supposing span 1 in the work path of service 1 fails as well, the handling process of the protection protocol unit is as follows:

step 6a': the protection protocol unit determines the type of the alarm resource, and confirms it is a working channel alarm;

step 6b': the protection protocol unit checks the state of the protection channel of service 1 and confirms it is on alarm, and thus the recovery operation needs to be started up immediately;

step 6c': the protection protocol unit sends the notification of "starting up the recovery operation immediately" to the recovery protocol unit.

The handling process of the recovery protocol unit after the fault of span 1 occurring is as follows:

step 6A: the recovery protocol unit receives the working channel alarm of service 1;

step 6B: the timer whose timing is set as holdoff is started up, wherein the value of the holdoff is set as 50 ms (because the switching time of the 1+1 protection is generally less than 50 ms);

step 6C: during waiting for the expiration of the timer, the notification from the protection protocol unit is received;

step 6D: the recovery operation is immediately started up, that is, starting up the service recovery mechanism of ASON in order to reroute the Service 1 and reducing the service fault time.

In step 6D, through the service recovery mechanism of ASON, the recovery path obtained through finally rerouting the Service 1 is Node A, Node G Node F, Node E, Node D and Node C, which is the path illustrated as a fine dotted line in FIG. 6. In this embodiment, when the working channel and protection channel of Service 1 both have alarm of failure, ASON is used to execute the recovery operation for Service 1 without waiting for the holdoff time, therefore the interrupt time of Service 1 is reduced.

Figure 7:
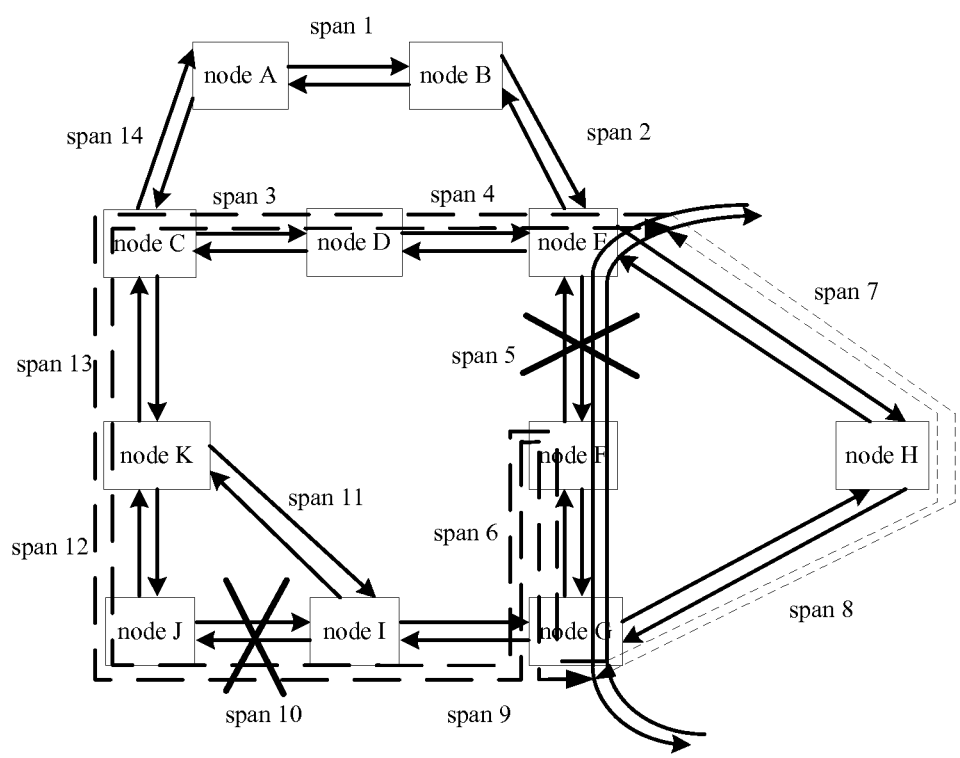
FIG. 7 is a schematic diagram of network topological structure in the second embodiment of the present invention.

As shown in FIG. 7, it is a schematic diagram of network topological structure of the embodiment of the present invention under the condition that the service has multiplex section shared protection and recovery attributes, wherein, a pair of service (marked as Service 2) exists between Node E and Node G, whose working path is node E, node F and node G Service 2 has multiplex section shared protection attributes. If span 5 fails, the protection path of service 2 is node E, node D, node C, node K, node J, node I, node G node F, and then to node G again. Meanwhile, service 2 also has recovery attributes, wherein if its working path and protection path both fail, the service needs to be recovered. Specifically, this embodiment relates to the following steps.

If Span 10 of the protection path of Service 2 fails, the handling process of the protection protocol unit is as follows:

step 7a: the protection protocol units of node I and node J receive an alarm;

step 7b: the protection protocol unit determines the type of the alarm, and confirms it is a protection channel alarm;

step 7c: the protection protocol unit records the alarm information, and marks the state of the protection channel of Service 2 as "on alarm".

If Span 5 in the working path of service 2 fails, the handling process of the protection protocol unit is as follows:

step 7a': the protection protocol unit determines the type of the alarm, and confirms it is a working channel alarm;

step 7b': the protection protocol unit checks the state of the protection channel of Service 2, which is on alarm, wherein since both the working channel and protection channel of service 2 have alarm of failure, the recovery operation needs to be started up immediately;

Step 7c': the protection protocol unit sends the notification of "starting up the recovery operation immediately" to the recovery protocol unit.

If fault occurring in span 5, the handling process of the recovery protocol unit is as follows:

step 7A: the recovery protocol unit receives the alarm from the working channel resource of service 2;

step 7B: the timer whose timing is set as holdoff is started up, wherein the value of holdoff is set as 50 ms (because the switching time of multiplex section shared protection is generally less than 50 ms);

step 7C: during the waiting for expiration of the timer, the recovery protocol unit receives the notification of "starting up the recovery operation immediately" from the protection protocol unit;

step 7D: the recovery operation is started up immediately, that is, the service recovery mechanism of ASON is started up, so as to reroute Service 2 as soon as possible and to reduce the service fault time.

In step 7D, through the service recovery mechanism of the ASON, the recovery path obtained through finally rerouting Service 2 is node E, node H and node G, which is shown as the path illustrated by the fine dotted line in FIG. 7. In this embodiment, when the alarm of fault occurring in both the working channel and protection channel of service 2, the ASON is used to execute the recovery operation for service 2 without waiting for the time of the holdoff, therefore reducing the interruption time of service 2.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of the claims of the present invention.

What is claimed is:

1. A device for coordinating an Automatic Protection Switching (APS) operation and a recovery operation, comprising a hardware processor, which executes a working channel detection unit, a protection protocol unit and a recovery protocol unit, wherein:

the working channel detection unit is configured to monitor working channel failures of services and to report a working channel alarm to the protection protocol unit and the recovery protocol unit in case of failure occurring in a working channel;

the protection protocol unit is configured to receive the working channel alarm and to determine whether a recovery operation needs to be started up immediately according to the working channel alarm, wherein if yes, it notifies the recovery protocol unit to start up the recovery operation immediately, otherwise it starts up an Automatic Protection Switching (APS) operation; and the recovery protocol unit is configured to receive the working channel alarm and the notification of immediately starting up the recovery operation, wherein it starts up the recovery operation when the notification of immediately starting up the recovery operation is received, or when the working channel alarm received still exists even if a predetermined time limit expires, wherein the recovery operation does not pre-configure a protection channel, and in the case of fault occurring in the working channel, the recovery operation recalculates a new channel for services in idle resources of current network, and the Automatic Protection Switching operation pre-configures a protection channel, and in the case of fault occurring in the working channel, the Automatic Protection Switching operation switches services to the protection channel.

2. The device for coordinating an APS operation and a recovery operation according to claim 1, wherein:

the hardware processor further executes a protection channel detection unit, which is configured to perform fault monitoring on the protection channel of service and to report a protection channel alarm to the protection protocol unit when the protection channel fails; and the protection protocol unit is further configured to receive the protection channel alarm.

3. A device for coordinating an APS operation and a recovery operation according to claim 2, wherein the protection protocol unit is further configured to determine the type of received alarm, and to record the alarm information of the protection channel and mark the state of the protection channel "on alarm" when the protection channel alarm is received.

4. A method for coordinating an Automatic Protection Switching (APS) operation and a recovery operation, comprising the following steps:

a working channel detection unit reporting a working channel alarm to a protection protocol unit and a recovery protocol unit of a node when a working channel of a current service of the node fails;

the recovery protocol unit starting up a timer after receiving the working channel alarm, the protection protocol unit determining whether the recovery operation needs to be started up immediately after receiving the working channel alarm, wherein if yes, the protection protocol unit notifies the recovery protocol unit to start up the recovery operation immediately, and the recovery protocol unit starts up the recovery operation immediately when the notification is received; and alarm processing for this time is completed, and if no, the protection protocol unit starts up an Automatic Protection Switching (APS) operation, wherein the recovery operation does not pre-configure a protection channel, and in case of fault occurring in the working channel, the recovery operation recalculates a new channel for services in idle resources of current network, and wherein the Automatic Protection Switching operation pre-configures a protection channel, and in the case of fault occurring in the working channel, the Automatic Protection Switching operation switches services to the protection channel.

5. A method for coordinating an APS operation and a recovery operation according to claim 4, wherein upon the protection protocol unit determining whether the recovery operation needs to be started up immediately after receiving the working channel alarm, the protection protocol unit starts up the APS operation if the result of the determination is the recovery operation needs not to be started up immediately; and the recovery protocol checks whether the working channel detection unit still has the alarm after waiting for expiration of the timer, wherein if the result is yes, it starts up the recovery operation, and then the alarm processing for this time is finished, otherwise the alarm processing for this time is finished.

6. A method for coordinating an APS operation and a recovery operation according to claim 4, wherein:

if the protection channel of current service fails, the protection channel detection unit reports a protection channel alarm to the protection protocol unit of the node.

7. A method for coordinating an APS operation and a recovery operation according to claim 6, wherein the protection protocol unit determines the type of an alarm after receiving the alarm, wherein if it is a working channel alarm, the recovery protocol unit starts up a timer after receiving the working channel alarm, and the protection protocol unit determines whether a recovery operation needs to be started up immediately after receiving the working channel alarm, wherein if it is a protection channel alarm, the protection protocol unit records the protection channel alarm information and marks the state of the protection channel "on alarm".

8. A method for coordinating an APS operation and a recovery operation according to claim 7, wherein the protection protocol unit determines whether a recovery operation needs to be started up immediately in the following approaches:

checking whether the state of the protection channel of current service is of having an alarm, wherein if yes, the recovery operation needs to be started up immediately, otherwise, it further checks whether the protection group of the service is in non-enabled state, where if the result is yes, the recovery operation needs to be started up immediately, otherwise the recovery operation needs not to be started up immediately.

9. A method for coordinating an APS operation and a recovery operation according to claim 4, wherein the protection protocol unit notifies the recovery protocol unit to start up the recovery operation immediately via but not limited to a Data Communication Network (DCN), a High Level Data Link Control (HDLC) protocol bus, and a communication approach among internal progresses of CPU.

10. A method for coordinating an APS operation and a recovery operation according to claim 6, wherein the protection channel detection unit reports an alarm to the protection protocol unit via but not limited to a DCN and a HDLC protocol bus.

11. A method for coordinating an APS operation and a recovery operation according to claim 6, wherein the protection protocol unit determines the type of an alarm after receiving the alarm, wherein if it is a working channel alarm, the recovery protocol unit starts up a timer after receiving the working channel alarm, and the protection protocol unit determines whether a recovery operation needs to be started up immediately after receiving the working channel alarm, wherein if it is a protection channel alarm, the protection protocol unit records the protection channel alarm information and marks the state of the protection channel "on alarm".

* * * * *